US008448828B2

(12) United States Patent
Nitti

(10) Patent No.: US 8,448,828 B2
(45) Date of Patent: *May 28, 2013

(54) SHIPPING BAG REVERSIBLE INTO A BACKPACK

(75) Inventor: Robert Anthony Nitti, Appomattox, VA (US)

(73) Assignee: Boss Licensing Group, Inc., Appomattox, VA (US)

( * ) Notice: Subject to any disclaimer, the term of this patent is extended or adjusted under 35 U.S.C. 154(b) by 597 days.

This patent is subject to a terminal disclaimer.

(21) Appl. No.: 12/702,592

(22) Filed: Feb. 9, 2010

(65) Prior Publication Data

US 2011/0192875 A1    Aug. 11, 2011

(51) Int. Cl.
*A45F 3/04* (2006.01)
*B65D 30/00* (2006.01)

(52) U.S. Cl.
USPC ............... 224/153; 224/655; 224/656; 383/4; 383/14; 383/109; 383/200; 383/98; 383/72; 383/75

(58) Field of Classification Search
USPC .................... 224/575, 153, 655, 656; 383/72, 383/6, 3, 64, 99, 4, 14, 109, 200, 98, 75, 383/61.4; 190/902
See application file for complete search history.

(56) References Cited

U.S. PATENT DOCUMENTS

| | | | |
|---|---|---|---|
| 2,871,900 A * | 2/1959 | Auditore | 383/6 |
| 3,109,474 A | 11/1963 | Levi | |
| 3,630,798 A | 12/1971 | Wicks | |
| 3,716,182 A * | 2/1973 | Korn | 383/62 |
| 3,746,066 A * | 7/1973 | McIntyre | 150/107 |
| 3,818,963 A | 6/1974 | Whitman | |
| 3,982,687 A * | 9/1976 | Auer et al. | 383/204 |
| 4,213,549 A * | 7/1980 | Hibbard | 224/601 |
| 4,301,849 A | 11/1981 | Litwack et al. | |
| 4,674,664 A * | 6/1987 | Simon | 224/604 |
| 4,681,781 A | 7/1987 | Murray | |
| 4,750,609 A | 6/1988 | Felis | |
| 4,941,196 A * | 7/1990 | Edelman et al. | 383/5 |
| 5,047,001 A | 9/1991 | Willis | |
| 5,370,461 A * | 12/1994 | Smith et al. | 383/4 |
| 5,399,020 A | 3/1995 | Cheng | |
| 5,490,619 A * | 2/1996 | Boyar | 224/153 |
| 5,653,337 A | 8/1997 | Cirigliano | |
| 5,670,274 A | 9/1997 | Forrer | |
| 5,676,466 A | 10/1997 | Lindenbeck | |
| 5,692,660 A | 12/1997 | Stewart | |
| 5,704,670 A * | 1/1998 | Surplus | 294/25 |
| 5,817,379 A | 10/1998 | Rich et al. | |
| 5,957,354 A * | 9/1999 | Mentken | 224/614 |
| 6,109,440 A | 8/2000 | Cliff | |

(Continued)

*Primary Examiner* — Justin Larson
*Assistant Examiner* — Lester L Vanterpool
(74) *Attorney, Agent, or Firm* — Louis Ventre, Jr.

(57) ABSTRACT

A flexible shipping bag, which after use for shipping an item in commerce, can be turned inside out and transformed into a re-usable backpack with an open top. The flexible shipping bag includes sealing flaps configured to enable opening the flexible shipping bag by cutting off a portion of the sealing-flap. The sealing-flaps fold into the flexible shipping bag when the flexible shipping bag is turned inside out revealing backpack flaps each configured to define a draw-string tube-like passage therethrough. The flexible shipping bag includes a drawstring and a tab extending from an inside edge of the shipping bag, preferably near the bottom, and configured to secure the drawstring. The inside of the shipping bag may also include a separate pouch. The top of the pouch may include means to close the pouch.

5 Claims, 4 Drawing Sheets

U.S. PATENT DOCUMENTS

| | | | |
|---|---|---|---|
| D439,040 S * | 3/2001 | Vazquez | D3/233 |
| 6,230,950 B1 * | 5/2001 | Heetman | 224/575 |
| 6,435,391 B1 * | 8/2002 | Vazquez | 224/656 |
| 7,106,202 B2 | 9/2006 | Dickinson | |
| 7,581,886 B2 | 9/2009 | Nitti | |
| 7,988,681 B2 * | 8/2011 | McGarity et al. | 604/317 |
| 2004/0058039 A1 * | 3/2004 | Strand et al. | 426/130 |
| 2004/0155077 A1 * | 8/2004 | Cullen et al. | 224/153 |
| 2006/0153477 A1 * | 7/2006 | Koguchi | 383/14 |
| 2007/0140599 A1 * | 6/2007 | Dalgleish et al. | 383/109 |
| 2008/0056622 A1 * | 3/2008 | Austreng et al. | 383/5 |
| 2009/0304310 A1 | 12/2009 | Nitti | |
| 2010/0209019 A1 * | 8/2010 | Confoy et al. | 383/4 |

* cited by examiner

SHIPPING BAG REVERSIBLE INTO A BACKPACK

TECHNICAL FIELD

In the field of flexible bags used for shipping products, a shipping bag is openable by a recipient by cutting off a segment of the shipping bag. Once the contents are removed, the shipping bag may be turned inside out to provide a durable backpack with a draw string for reclosing the bag. The shipping bag serves to reduce shipping waste and generate good will towards the shipper with subsequent use as a flexible backpack.

BACKGROUND ART

The present invention is a novel and unique variation of the invention disclosed in applicant's U.S. Pat. No. 7,581,886, issued 9 Sep. 2009 and U.S. patent application Ser. No. 12/543,365. Those inventions involve a shipping bag convertible to a tote bag and a cosmetic bag, respectively. Some of the features of the present invention are the same. However, the present invention is distinct over those inventions by the addition of a draw string configured to both close the backpack when in use and to be the backpack arm bands.

SUMMARY OF INVENTION

A flexible shipping bag, which after use for shipping an item in commerce, can be turned inside out and transformed into a re-usable backpack with an open top. The flexible shipping bag includes sealing flaps configured to enable opening the flexible shipping bag by cutting off a portion of the sealing flaps. The sealing-flaps fold into the flexible shipping bag when the flexible shipping bag is turned inside out revealing backpack flaps each configured to define a drawstring tube-like passage therethrough. The flexible shipping bag includes a drawstring and a tab extending from an inside edge of the shipping bag, preferably near the bottom, and configured to define a hole for securing the drawstring. The drawstring is configured to be secured to the tab and thread through at least two drawstring passages in order to close the open top when the drawstring is pulled. Preferably, there are two drawstrings and each start at a tab and then pass through one drawstring passage and back through a second drawstring passage to be secured at the starting tab. The inside of the shipping bag may also include a separate pouch that is usable when it is converted to a backpack. The pouch is preferably formed by a sheet of material extending from the bottom across a width and up to a point below the top to the backpack. The top of the pouch may include VELCRO or other means to secure at least a portion of the pouch opening at the top.

Technical Problem

Commerce of the United States depends to a large extent on shipping products to the consumer. Whether by United States mail or by one of the contract parcel carriers, many businesses respond to orders from consumers by placing the items ordered in a box or shipping bag and sending it to the consumer. While inexpensive, a shipping bag of this kind has no value after it is employed for shipping, it immediately adds to the stream of disposable consumer garbage, and is of little value to the shipper after it is discarded.

Solution to Problem

The present invention provides a durable shipping bag that retains value in the eye of the recipient after it is received, that promotes retention and use of the bag by the recipient, and that generates good will towards the shipper either in the form of advertising for the shipper, or simply by the recipient's use of the bag.

While the prior art teaches one or another of these objects, or variations of them, none has been found to capture all of the features and limitations in a flexible shipping bag.

The present invention starts out as a durable shipping bag in the form of a flexible bag. The bag typically starts out with a shipping bag sender, not the recipient. A sender may purchase the flexible shipping bag in a store, fill it with a gift and have it delivered to a friend; or, a commercial vendor may use it to send a product to the vendor's customer. In either case, the exterior of the flexible shipping bag can be a means of advertising, either to defray the cost of the flexible shipping bag for the purchaser, or to be a means for the vendor to advertise and generate good will towards the vendor.

Advantageous Effects of Invention

The invention provides a durable shipping bag that possesses greater utility than a shipping bag; that is, one that can be easily reused as a consumer product, a backpack, carry-all, or other utilitarian bag, after it is employed as a shipping bag.

BRIEF DESCRIPTION OF DRAWINGS

The drawings show preferred embodiments of the invention and the reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural and operational changes may be made, without departing from the scope of the present invention.

Figure 1:
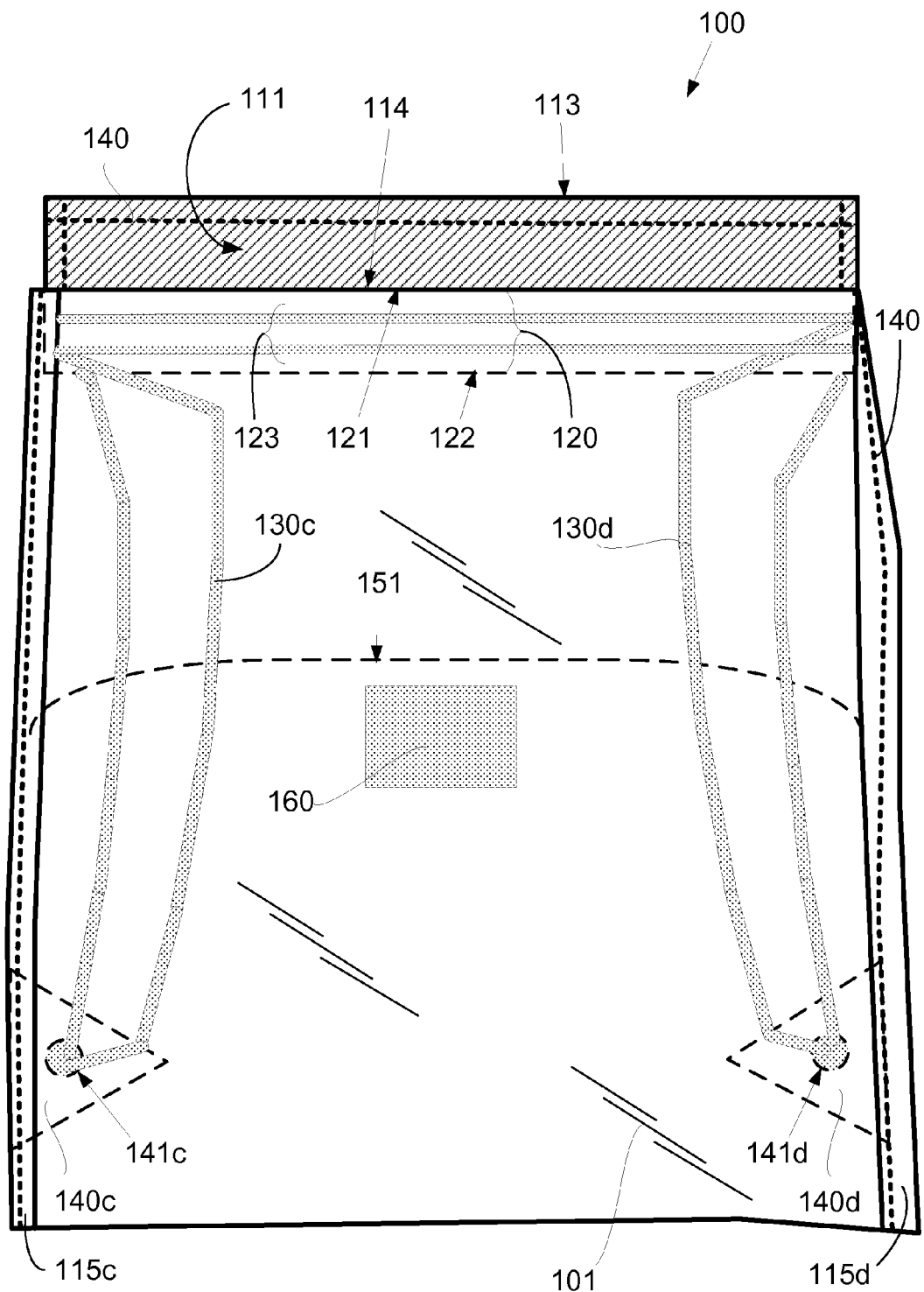
FIG. 1 is a front elevation view of the flexible shipping bag.

FIG. 1 shows a front elevation view of a preferred embodiment of the flexible shipping bag (100). The flexible shipping bag (100) is amenable to sizes and shapes common for shipping bags. Ignoring the internal components shown with longer dashed lines, the external front elevation view of the flexible shipping bag (100) is indistinguishable from its rear elevation view. As with any such shipping bag, the preferred flexible shipping bag (100) has 3 closed sides and an open top. A triangular or other shape bag is also possible, but an open top is required to enable insertion of goods for shipment. The flexible shipping bag (100) is configured to be turned inside out to a re-usable backpack (300) shown in FIG. 3 and FIG. 4.

Figure 3:
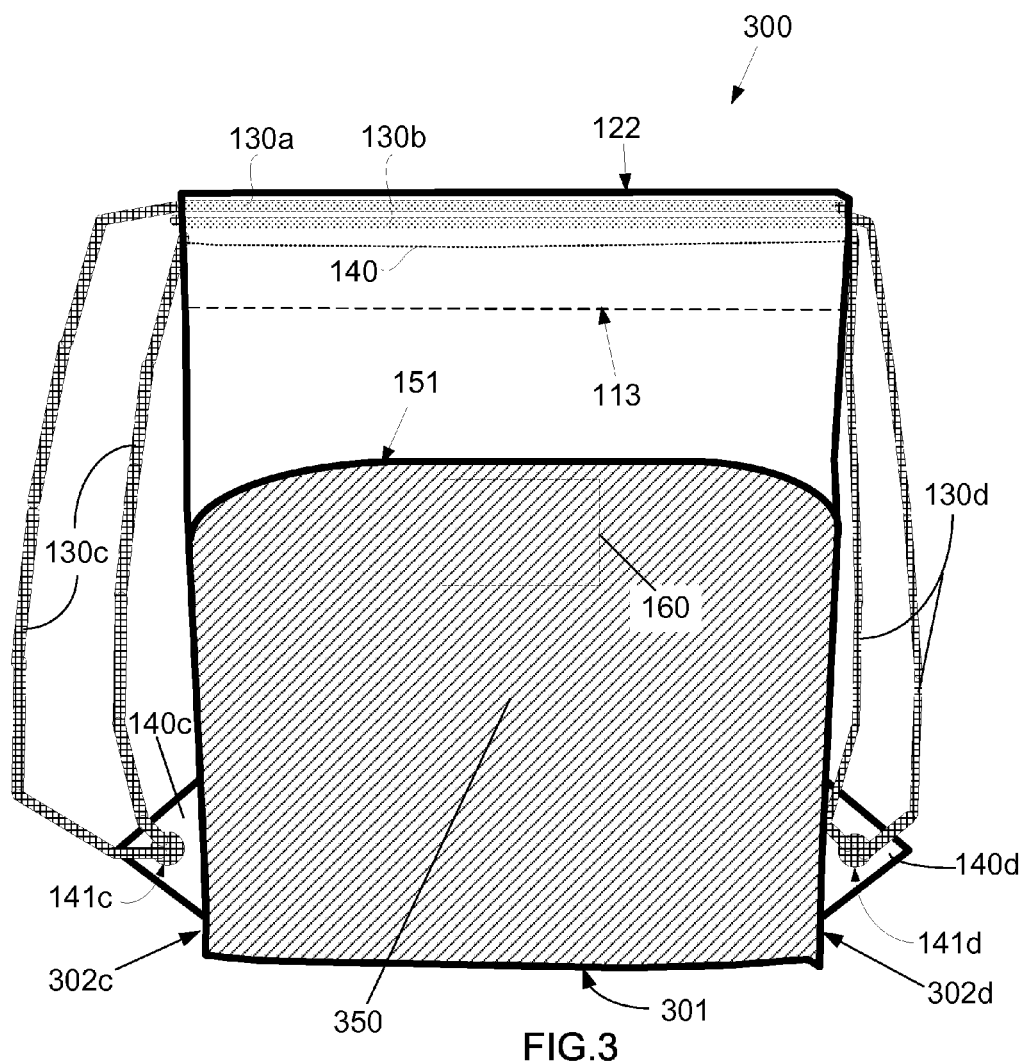
FIG. 3 is a front elevation view of the backpack.
Figure 4:
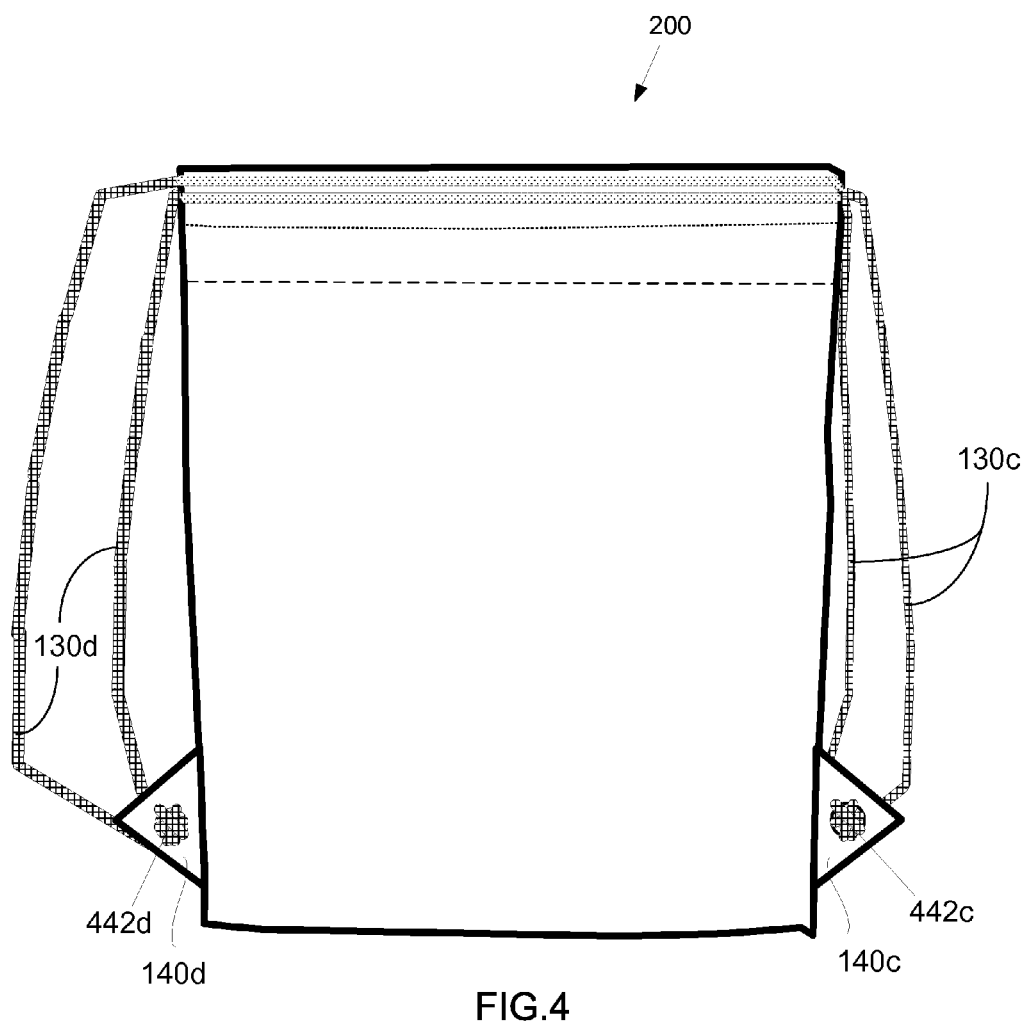
FIG. 4 is a rear elevation view of the backpack.

FIG. 3 shows a front elevation view of a preferred embodiment of the re-usable backpack (300), which is the flexible shipping bag (100) turned inside out. The rear elevation view of this embodiment of the re-usable backpack (300) is shown in FIG. 4. Alternative embodiments of the re-usable backpack (300) may be made with nearly identical front and rear elevation views.

Figure 2:
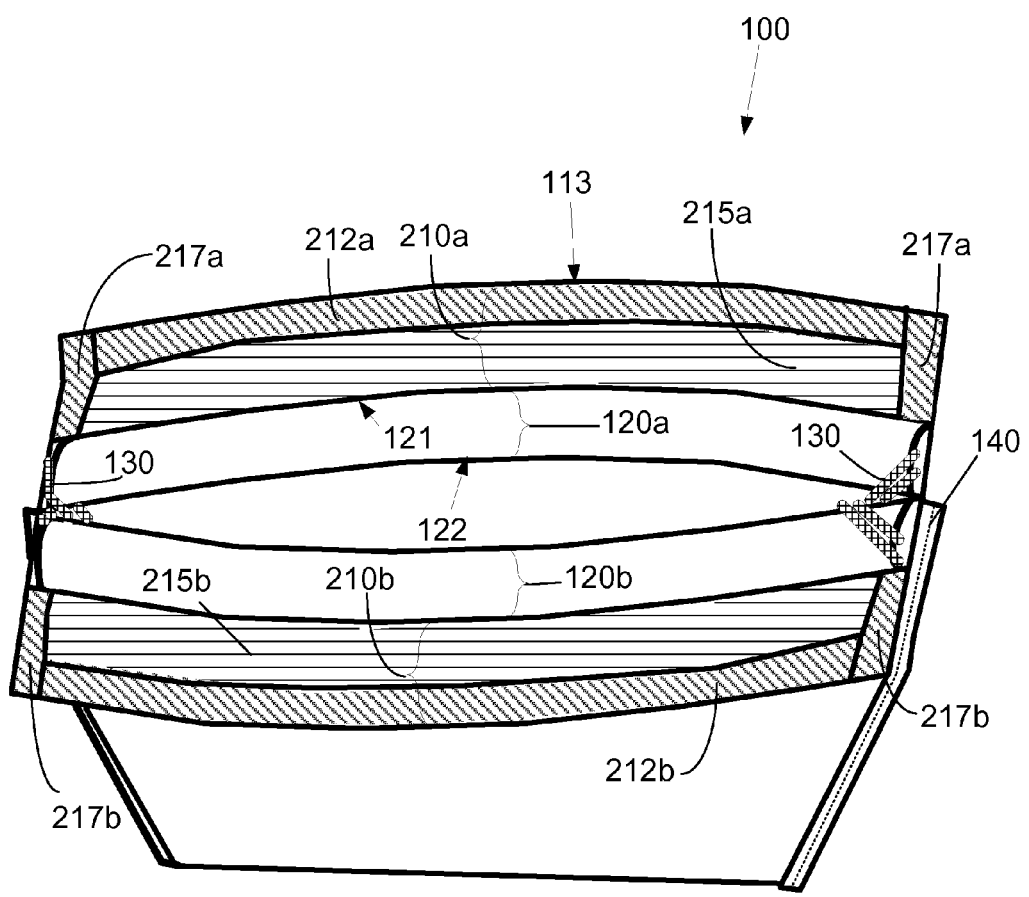
FIG. 2 is a top perspective view of the flexible shipping bag.

Preferably, the exterior of the flexible shipping bag (100), except for the sealing flaps, is a durable plastic covering (101). The sealing flaps for a preferred embodiment are shown in FIG. 2 and identified as the front-sealing flap (210a) and the rear-sealing flap (210b).

The durable plastic covering (101) is preferably one piece that extends from the seam below the front-sealing flap (210a) to the seam below the rear-sealing flap (210b) of the flexible shipping bag (100), which leaves the sealing flaps uncovered on its outside wall (111).

The sides of the durable plastic covering (101) are preferably folded over and sewn to create a sealed plastic covering over the material used for the inside of the flexible shipping bag (100) and for the exterior of the sealing flaps (210a and 210b). The sides are shown in FIG. 1 and identified as the left-side seam (115c) and the right-side seam (115d). The stitching (140) is shown with short dash lines in contrast to the longer dashed lines showing hidden or internal components of the flexible shipping bag (100).

When the flexible shipping bag (100) is turned inside out, this material, comprising the inside of the flexible shipping bag (100), becomes the material that is on the outside of the re-usable backpack (300). When the flexible shipping bag (100) is turned inside out, the plastic cover (101) becomes the lining of the re-usable backpack (300).

Referring to FIG. 1 and FIG. 2, the flexible shipping bag (100) comprises sealing flaps, preferably a front-sealing flap (210a) and a rear-sealing flap (210b); a backpack flap for each of the sealing flaps, preferably a front-backpack flap (120a) and a rear-backpack flap (120b); a drawstring, such as a left-side drawstring (130c) or a right-side drawstring (130d); and a tab, such as a left-side tab (140c) or a right-side tab (140d).

The sealing flaps extend approximately across the opening at the top of the flexible shipping bag (100). The sealing flaps each comprise the material used on the inside of the flexible shipping bag (100), a sealing-flap top edge (113), and, a sealing-flap bottom edge (114). Preferably, the outside wall (111) of each of the sealing flaps (210a and 210b) is just this material, which is consistent with the use of the durable plastic covering (101) on the exterior of the flexible shipping bag (100) over the area between the front-sealing flap (210a) and the rear-sealing flap (210b).

On the inside wall of the front-sealing flap (210a), shown in FIG. 2, there is, optionally, a front-sealing-flap top segment (212a) and a front-sealing-flap bottom segment (215a). The rear-sealing flap (210b) is similarly configured and for simplicity, the discussion focuses only on the front-sealing flap (210a), but it should be understood that it applies equally to the rear-sealing flap (210b). For example, it is noted that reference to the drawings will show that there are a corresponding rear-sealing-flap top segment (212b), a rear-sealing-flap bottom segment (215b), and a rear-sealing-flap side segments (217b).

The front-sealing-flap bottom segment (212a) may be used to locate an insert to enhance closure of the flexible shipping bag (100). For example a plastic insert may be sewn into the seam at the bottom and at the sides to promote sealing of the flexible shipping bag (100) with double sided tape. The plastic insert provides a surface amenable to attaching a peel and stick self adhesive strip to one of the sealing flaps and also promoting the seal of the front and rear flaps to each other to close the bag for shipping. The front-sealing-flap top segment (212a) and the front-sealing-flap side segments (217a) are essentially fold-overs of the material on the exterior face of the re-usable backpack (300). The fold-overs create a uniform edge and prevent the end of the material from fraying.

When the flexible shipping bag (100) is used for shipping, the item to be shipped is place in the flexible shipping bag (100) through the open top. The sealing flaps are then joined together with tape, glue, staples, or other means commonly used to seal a shipping bag prior to shipment.

The sealing flaps are configured to enable opening the flexible shipping bag (100) by cutting through the sealing flaps between the sealing-flap top edge (113) and, a sealing-flap bottom edge (114). Once the flexible shipping bag (100) is received at its destination, it must be opened by the recipient. The recipient might simply pull apart the sealed sealing flaps. Preferably, the sealing means, for example a strip of double-sided tape, would simply be cut off to permanently remove it from the flexible shipping bag (100). The shipping flaps are thus tall enough to enable the recipient to cut off a top portion of the sealing flaps, perhaps at a cut-off marking on the exterior of the shipping flaps.

Each sealing-flap bottom edge (114) is configured to permit folding its sealing flap into the flexible shipping bag when the flexible shipping bag is turned inside out, and thereby conceal the sealing flap to an external viewer. For preferred embodiments, the sealing-flap bottom edge (114) is co-located with a backpack-flap top edge (121), such that by rotating the flaps at the co-located edge, the sealing flap is hidden within the reusable backpack (300) and the backpack flap is exposed with the backpack-flap bottom edge (122) becoming the backpack top edge (124). Thus, the backpack-flap bottom edge (122) is attached inside the flexible shipping bag (100) below its corresponding sealing flap. The backpack flaps are, thus, configured to invert when the flexible shipping bag (100) is turned inside out such that the backpack-flap bottom edge (122) is positioned at the open top of the re-usable backpack (300).

Thus, the flexible shipping bag (100) also includes a backpack flap for each sealing flap. For the embodiment shown in FIG. 1, there is a front-backpack flap (120a) and a rear-backpack flap (120b). Here again the rear-backpack flap (120b) is similarly configured and for simplicity, the discussion focuses only on the front-backpack flap (120a), but it should be understood that it applies equally to the rear-backpack flap (120b).

The front-backpack flap (120a) includes a backpack-flap top edge (121) and a backpack-flap bottom edge (122). The front-backpack flap (120a) is configured to define a tube-like passage, referred to herein as drawstring passage (123), from side to side of the re-usable backpack (300) and within the space defined by the backpack-flap top edge (121) and a backpack-flap bottom edge (122). The drawstring passage (122) is used to route the drawstring, preferably two drawstrings, into a configuration that enables closure of the re-usable backpack (300) by pulling on the drawstring.

The flexible shipping bag (100) next includes the drawstring, preferably two drawstrings: a left-side drawstring (130c) and the right-side drawstring (130d). Each drawstring is routed through one drawstring passage and back through another. For example, the left-side drawstring (130c) would be routed through the drawstring passage (122) of the front-backpack flap (120a) and back through the similar drawstring passage of the rear-backpack flap (120b). Similarly, the right-side drawstring (130b) would be routed through the drawstring passage (122) of the front-backpack flap (120a) and back through the similar drawstring passage of the rear-backpack flap (120b). Pulling on these drawstrings would simultaneously draw the open top of the re-usable backpack (300)

together. Thus, each drawstring will thread through at least two drawstring passages in order to close the open re-usable backpack (300).

The flexible shipping bag (100) next includes the tab, preferably two tabs: a left-side tab (140*c*) and a right-side tab (140*d*). The tab extends from an inside edge of the flexible shipping bag (100) and is configured to define a hole for securing a drawstring. While alternative embodiments may employ only a single tab, which would be used for both drawstrings, there is in the preferred embodiment noted above a hole in each of the two tabs: a left-side hole (141*c*) in left-side tab (140*c*) and a right-side hole (141*d*) in right-side tab (140*d*), wherein one such tab is used to tie off one drawstring. The hole in the tab facilitates tying off a drawstring. So the drawstring is configured to be secured to the tab, preferably by passing the ends of the drawstring through the hole and tying a knot larger than the hole to secure it to the tab. This is best shown in FIG. 4, which is a rear elevation view of the re-usable backpack (300). Note that because it is a rear view, the left-side of the re-usable backpack (300) is shown at the right.

In FIG. 4, the right-side tab (140*d*) secures the right-side drawstring (130*d*) wherein the right-side drawstring (130*d*) ends with a right-side knot (442*d*) and the left-side drawstring (130*c*) ends with a left-side knot (442*c*).

Alternative embodiments of the flexible shipping bag (100) may include a pouch (350) secured to the re-usable backpack (300) and configured with an opening at the pouch top end (151). As shown in FIG. 3, the re-usable backpack comprises a closed bottom (301) and two closed sides: a closed left-side (302*c*) and a closed right-side (302*d*). The pouch is preferably made of a sheet of material extending from the closed bottom (301) across a width defined by the two closed sides, that is, closed left-side (302*c*) and a closed right-side (302*d*). The sheet of material extends up to the pouch top end (151) at a point below the open top of the re-usable backpack (300).

The pouch top end (151) may include a means to secure at least a portion of the opening at the pouch top end (151). This might include a button, snap, zipper or other such means. The embodiment shown in FIG. 3, shows a VELCRO (160) attachment at the inside center of the pouch (350) near the pouch top end (151).

While there has been described herein what is considered to be the preferred exemplary embodiment of the present invention, other modifications of the present invention shall be apparent to those skilled in the art from the teachings herein, and it is therefore, desired to be secured in the appended claim all such modifications as fall within the true spirit and scope of the invention. Accordingly, what is desired to be secured by Letters Patent of the United States is the invention as defined and differentiated in the claims that follow.

INDUSTRIAL APPLICABILITY

The invention has application to the shipping industry, the sports industry and the apparel industry.

What is claimed is:

1. A flexible shipping bag configured to be turned inside out to a re-usable backpack with an open top, the flexible shipping bag comprising:
   sealing flaps each comprising: a sealing-flap top edge; and, a sealing-flap bottom edge;
      wherein the sealing flaps are configured to enable opening the flexible shipping bag by cutting through the sealing-flaps between the sealing-flap top edge and the sealing-flap bottom edge;
      wherein each sealing-flap bottom edge is configured to permit folding its sealing flap into the flexible shipping bag when the flexible shipping bag is turned inside out, and thereby conceal the sealing flap to an external viewer;
   a backpack flap for each sealing flap, each backpack flap comprising:
      a backpack-flap top edge;
      a backpack-flap bottom edge;
      wherein each backpack flap is configured to define a drawstring passage through itself;
      wherein the draw-string passage is between the backpack-flap top edge and the backpack-flap bottom edge;
      wherein each backpack-flap bottom edge is attached inside the flexible shipping bag below its corresponding sealing flap;
   a drawstring;
   a tab extending from an inside edge of the flexible shipping bag and configured to define a hole for securing the drawstring;
   wherein the drawstring is configured to be secured to the tab and thread through at least two drawstring passages in order to close the open top when the drawstring is pulled; and,
   wherein the backpack flaps are configured to invert when the flexible shipping bag is turned inside out such that the backpack-flap bottom edge is positioned at the open top of the backpack.

2. The flexible shipping bag of claim 1 consisting of two drawstrings and two tabs; wherein each drawstring is configured to pass into a first drawstring passage in one direction and loop back through a second drawstring passage in the reverse direction and be secured at one tab.

3. The flexible shipping bag of claim 1, further comprising a pouch secured to the re-usable backpack and configured with an opening.

4. The flexible shipping bag of claim 3, further comprising a means to secure at least a portion of the opening.

5. The flexible shipping bag of claim 3, wherein the re-usable backpack comprises a closed bottom and two closed sides; and wherein the pouch comprises a sheet of material extending from the closed bottom across a width defined by the two closed sides, and up to a point below the open top.

\* \* \* \* \*